E. A. WALDSPURGER.
NOSE BAG FOR HORSES.
APPLICATION FILED JULY 29, 1911.
1,017,610.
Patented Feb. 13, 1912.
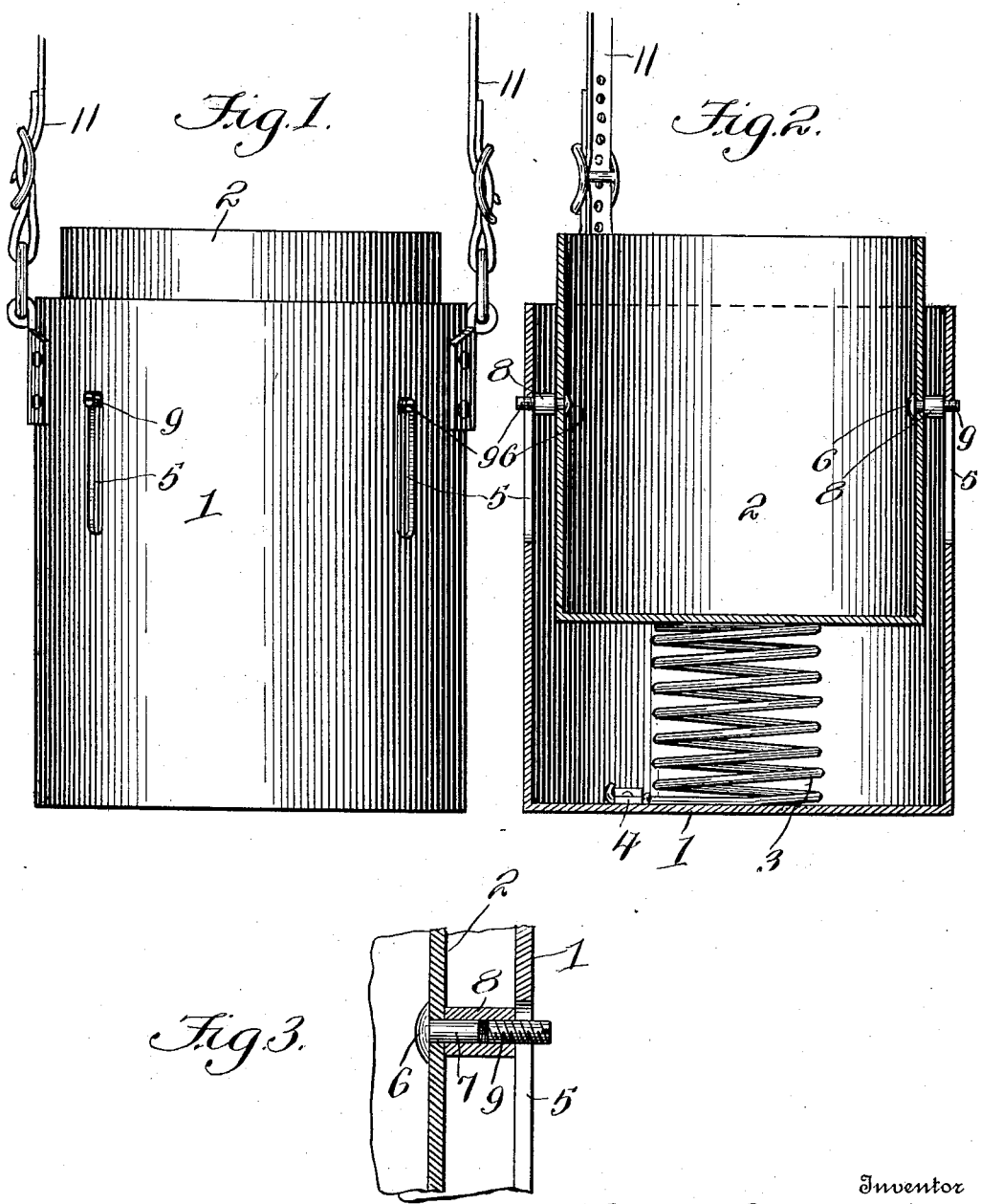
Witnesses
J. T. L. Wright,
Inventor
Ernest A. Waldspurger
By Victor J. Evans,
Attorney

UNITED STATES PATENT OFFICE.

ERNEST A. WALDSPURGER, OF PHILADELPHIA, PENNSYLVANIA.

NOSE-BAG FOR HORSES.

1,017,610.  Specification of Letters Patent.  Patented Feb. 13, 1912.

Application filed July 29, 1911. Serial No. 641,218.

*To all whom it may concern:*

Be it known that I, ERNEST A. WALDSPURGER, a citizen of the United States, residing at Philadelphia, in the county of Philadelphia and State of Pennsylvania, have invented new and useful Improvements in Nose-Bags for Horses, of which the following is a specification.

This invention relates to nose bags for horses, and has for an object to provide a device which will include an inner receptacle and an outer receptacle, the said receptacles being relatively movable and being provided with means whereby the inner receptacle which is adapted to contain the feed can be automatically elevated toward the mouth of the animal as the feed is spent, thereby positively preventing the accidental loss of the feed which is common, incident to the jerking of the animal's head to enable him to reach the feed.

Another object of the invention is to provide a bag which will include means whereby the inner and the outer receptacles can be readily associated with each other and operatively connected together.

In the drawing, forming a portion of this specification and in which like numerals of reference indicate similar parts in the several views:—Figure 1 is a side view of the bag. Fig. 2 is a vertical section therethrough. Fig. 3 is a vertical section through portions of the inner and outer receptacles showing the manner of slidably connecting these receptacles together.

The bag comprises an outer receptacle 1 and an inner receptacle 2, the latter having its walls spaced from the outer receptacle and mounted therein for vertical sliding movement. The outer receptacle is considerably deeper than the inner receptacle and interposed between the bottom of the outer receptacle and the bottom of the inner receptacle is a coiled extensile spring 3, the lower terminal of the spring being secured, at 4, to the bottom of the outer receptacle so as to prevent accidental displacement of the spring. The outer receptacle is provided with a plurality of elongated vertical guide slots 5. The inner receptacle is provided with a plurality of radial rivets 6, the stem portions 7 thereof being extended in the direction of the guide slots 5. Secured by solder or the like to the stem portions of the rivets are spacing sleeves 8 which operatively hold the inner and the outer receptacles spaced from each other and which operate to prevent binding of the receptacles against each other. The outer ends of the sleeves are interiorly threaded and fitted therein are the stub screws 9. Each screw is of the same diameter throughout and it is adapted to be driven into the sleeve 8 from the exterior of the outer receptacle so as to facilitate connecting the receptacles with each other. The upper walls of the vertical guide slots 5 form stops which will be engaged by the outer ends of the screws 9 so as to limit the upward movement of the inner receptacle and thereby prevent the same from being entirely withdrawn from the outer receptacle. The outer receptacle has attached thereto a suitable head strap 11 which may be engaged in any suitable well known manner with the head of the animal so as to hold the inner feed receptacle 2 operatively positioned beneath the mouth of the animal. Under the weight of the feed when placed in the inner receptacle the latter will be lowered and the spring 3 will be held under tension. As the feed is removed from the inner receptacle the latter will be automatically controlled or moved so that the bottom of the receptacle will be always held in such proximity with respect to the mouth of the animal so as to enable the animal to effectively reach the feed without having to shake his head.

I claim:—

1. A nose bag comprising an outer receptacle, an inner receptacle, means in the outer receptacle for moving the inner receptacle in one direction, lateral stems secured to the inner receptacle spacing elements supported by the stems and having portions extending beyond the said stems, and means having sliding engagement with the outer receptacle and removably fitted in said spacing elements.

2. A nose bag comprising an outer receptacle, an inner receptacle, means in the outer receptacle for moving the inner receptacle in one direction, rivets supported by the inner receptacle and having stem portions extending in the direction of the outer receptacle, spacing elements supported by the stems and having portions extending beyond the said stems, the said outer receptacle having vertical slots therein, and removable devices extending through the slots and into the said spacing elements.

3. A nose bag comprising an outer receptacle, an inner receptacle, means in the outer receptacle for moving the inner receptacle in one direction, rivets supported by the inner receptacle and having stem portions extending in the direction of the outer receptacle, spacing elements supported by the stems and having portions extending beyond the said stems, and devices extending through the slots and threadedly connected with the said spacing elements.

In testimony whereof I affix my signature in presence of two witnesses.

ERNEST A. WALDSPURGER.

Witnesses:
FRANK KLAEMAN,
NORMAN J. SMITH.

Copies of this patent may be obtained for five cents each, by addressing the "Commissioner of Patents, Washington, D. C."